April 7, 1970  D. J. HAAS ET AL  3,505,143
METHOD OF LAMINATING SHEET MATERIAL BY COATING METAL FOIL
WITH A COPOLYMER OF ETHYLENE AND A ETHYLENICALLY
UNSATURATED CARBOXYLIC ACID
Filed March 10, 1966

INVENTOR.
DAVID JOHN HAAS
KURT FRITZ ROESCH
BY Patrick J. Welch
ATTORNEY 3,505,143
METHOD OF LAMINATING SHEET MATERIAL BY COATING METAL FOIL WITH A COPOLYMER OF ETHYLENE AND AN ETHYLENICALLY UNSATURATED CARBOXYLIC ACID
David J. Haas, Neenah, Wis., and Kurt F. Roesch, Des Plaines, Ill., assignors to American Can Company, New York, N.Y., a corporation of New Jersey
Filed Mar. 10, 1966, Ser. No. 533,340
Int. Cl. B29b 3/00
U.S. Cl. 156—243                                 2 Claims

ABSTRACT OF THE DISCLOSURE

A method for manufacturing laminated sheets having a layer of metal foil. In the method a base layer or substrate is coated in succession with an adhesion layer, a metal foil layer and another coating of the adhesion layer. The method provides a laminated structure including a metal foil layer which resists delamination.

---

The present invention relates to laminated sheet material and more particularly to a method for manufacturing laminated sheets which are used for making the walls of collapsible tubes.

Plastic collapsible tubes have been widely known and used for packaging cosmetics and personal preparations such as shampoo. Plastics like polyethylene are relatively inert and can resist chemical attack from many products which react chemically with metal tubes. Heretofore plastic tubes have been limited in their application because they provide a poor barrier to moisture, oxygen, and volatile ingredients like essential oils or perfumes.

In order to extend the use of collapsible plastic tubes to products like mustard having volatile ingredients, plastic tubes may include a barrier layer of metal foil laminated to the plastic. The combination of plastic and metal foil layers yields an improved collapsible tube. The metal foil barrier layer in the wall of the improved tube prevents loss of essential ingredients and the plastic in the wall of the improved tube and protects the metal foil barrier layer against chemical attack.

An improved tube comprising layers of plastic and metal foil is disclosed in the Brandt and Kaercher U.S. Patent No. 3,260,410, granted July 12, 1966 owned by the assignee of the present invention. In the Brandt et al. application, the preferred plastic laminate is a co-polymer of an olefin such as polyethylene and an ethylenically unsaturated carboxylic acid such as acrylic acid. This co-polymer adheres well to metal foil and provides a tube wall which resists delamination.

While the preferred co-polymer in said application exhibits good adhesion to metal foil, difficulty has been encountered in obtaining good adhesion between the co-polymer and the metal foil using known methods to produce commercial quantities of the sheet material.

The present invention provides a method for manufacturing laminated tube walls whereby an effective and durable bond is obtained between metal and plastic layers of the laminated wall of a collapsible tube.

Another object of the present invention is to provide a method by which the shelf life of laminated metal foil and plastic sheet material may be extended.

Another object of the present invention is to provide a method for continuous coating of a metal foil barrier layer in a composite sheet material.

These and other objects of the present invention will become apparent upon an understanding of the preferred embodiment selected to describe the present invention. The preferred embodiment of the invention has been chosen to illustrate the principles of the present invention and may be varied without departing from the spirit and scope of the present invention.

The preferred embodiment of the present invention is described with particular reference to collapsible tubes. It will be understood that the sheet material according to the present invention may be used for other purposes than collapsible tubes.

Figure 1:
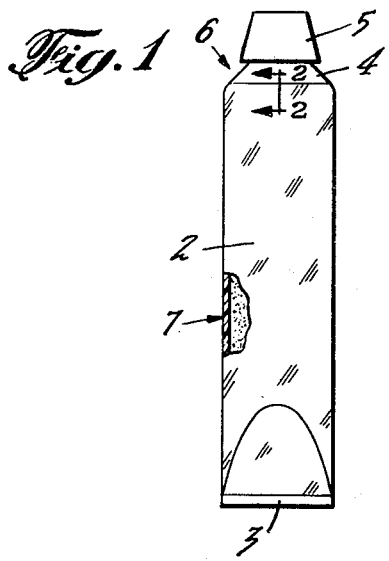
FIGURE 1 is a side elevation view of a collapsible tube having a laminated wall which is prepared according to the present invention.

Referring to FIGURE 1 of the drawings, a collapsible tube 1 includes a tube wall 2 which is heat sealed at its lower end 3. A headpiece 4 and a cap 5 enclose the upper end 6 of the tube. The tube wall 2 comprises a laminated sheet 7 which is rolled into tube form and joined in a side seam (not shown) at the edges of the sheet.

Figure 2:
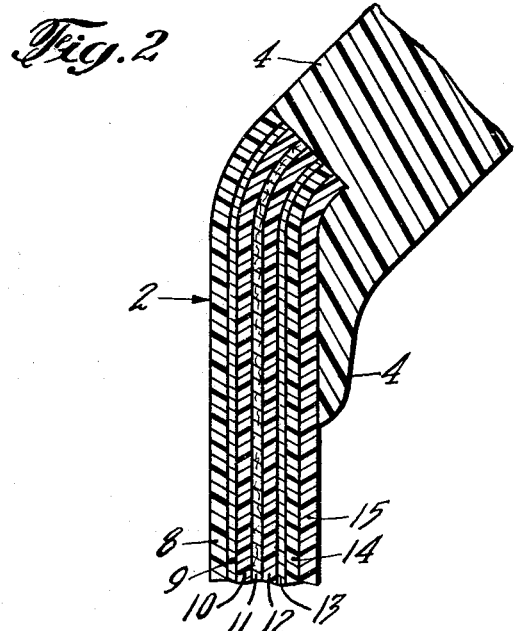
FIGURE 2 is an enlarged section view taken along line 2—2 of FIGURE 1 to illustrate the individual layers which may comprise the tube wall according to the present invention.

As best shown in FIGURE 2, the tube wall includes a plurality of layers 8–15. Outer layers 8, 9, 10, and 11 may be referred to as decorative layers and inner layers 12, 13, 14, and 15 may be referred to as barrier layers.

The tube wall 2 may be manufactured in any suitable manner to achieve the decorative and barrier functions. Usually the decorative layers 8–11 are laminated first and then are joined to barrier layers 12–14. After joinder of the decorative and barrier layers, a plastic coating 15 is applied to the inner surface of the tube wall.

In preparing the decorative layers 8–11, a flat sheet of glassine paper 11 is coated with a layer of polyethylene 10 which layer is pigmented for opacity and to give a solid color background. A layer 9 of printed data is applied against the background layer 10. Next an outer layer 8 of clear polyethylene protects the layer 9 of printed data and adds to the attractiveness of the tube wall 2.

The glassine paper 11 lends dimensional stability to the decorative layers 8–11 which include polyethylene. Thus the decorative layers may be rerolled for subsequent lamination with the barrier layers 12–15. The barrier layers 12–15 prevent migration of essential oils, oxygen, moisture and the like through the tube wall.

Figure 3:
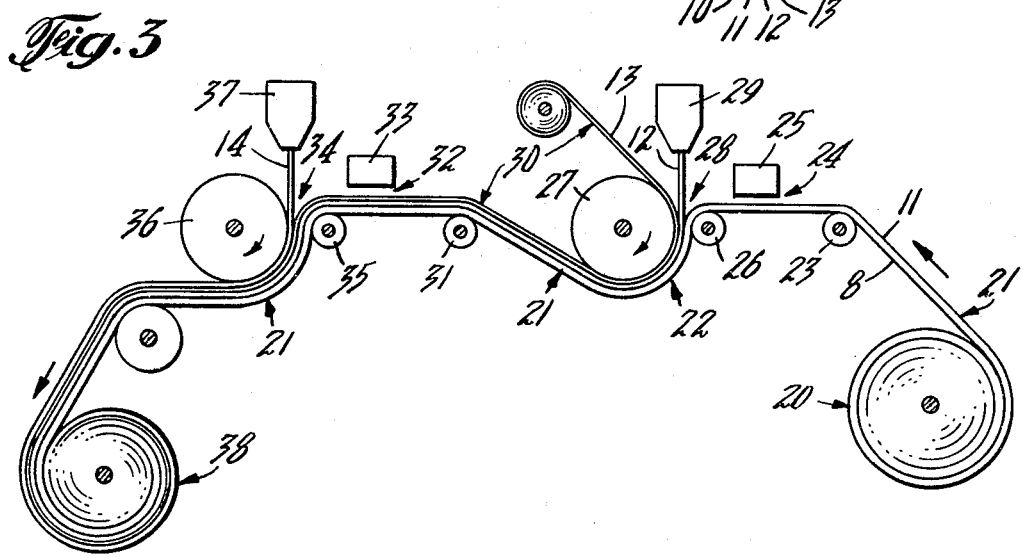
FIGURE 3 is a schematic view illustrating the apparatus for laminating sheet material for tube walls according to the present invention.

As shown in FIGURE 3, the decorative layers 8 through 11 are mounted on an unwind roll 20 for processing in the form of a sheet 21 through a laminating apparatus, indicated generally at 22. During the unwinding operation, the layer of glassine paper 11 appears on the upper surface of the sheet 21 for joinder with the barrier layers 12–14. The clear polyethylene layer 8 is on the underside of the sheet 21 and is not coated. A suitable roller 23 may be used for supporting the sheet 21.

As shown in FIGURE 3, the sheet 21 moves toward a priming station 24 as it enters the laminating apparatus 22. At the priming station 24 the upper surface, i.e. glassine paper surface 11, of the sheet is primed, that is, prepared to be laminated to another layer 12. Preferably, a preheater 25 extends across the sheet 21 and heats sheet surface 11. Alternatively, polyethylene imine may be used to prime the sheet surface.

After the priming operation the sheet 21 moves into the nip of a pressure roll 26 and a chill roll 27 which define a first coating station shown generally at 28. At this station, a layer 13 of metal foil is joined to the sheet 21 by means of a suitable plastic layer 12. Preferably the layer 13 is aluminum foil and the layer 12 is a copolymer of polyethylene and acrylic acid which co-polymer exhibits good adhesion to aluminum foil. The co-polymer of polyethylene and acrylic acid may be applied in any suitable manner as for example by extrusion under suitable heat and pressure through an extrusion die 29. The co-polymer is extruded in a thin layer (about 1.3 mils thin) which extends across the width of the metal foil layer 13 and the sheet 21.

Applicants have determined that both surfaces of the metal foil layer 13 should be coated on both surfaces with a suitable plastic without removing the sheet 21 from the laminating apparatus 22. Applicants believe that contamination of the uncoated metal foil surface 30 occurs if the sheet 21 is put in roll form between coating operations. If rolled, the uncoated metal foil surface 30 contacts a coating on the other side of the foil which is believed to be the source of contamination. The coating causing contamination may be layer 8, layer 9 or layer 10 depending on sequence of adding plastic layers. Applicants believe that such contamination interferes with proper bonding between the co-polymer and the metal foil. By avoiding this contamination, a durable bond between co-polymer and metal foil is obtained.

Accordingly, the sheet 21 is passed over a suitable support roller 31 to a second priming station 32 where the sheet 21, metal foil surface 30 uppermost, is preheated. Wrinkling of the metal foil 13 is prevented by adjusting the preheater temperature or the speed of the sheet 21.

After preheating, the sheet 21 moves to a second coating station 34 defined by a pressure roller 35 and a chill roller 36. Here a layer 14 of suitable plastic, i.e., the co-polymer of ethylene and acrylic acid is adhered to the upper surface 30 of metal foil layer 13. Again the coating operation is accomplished by extruding the co-polymer through an extrusion die 37 as at the first coating station 28.

After passing through the second coating station 34, the sheet 21 is removed by a rewind roll 38.

Figure 4:
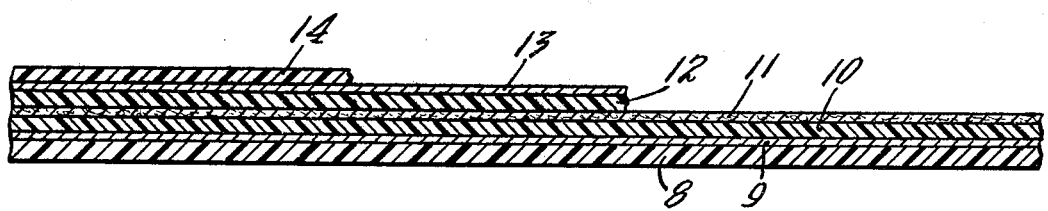
FIGURE 4 is a section view of a laminated sheet corresponding to the various stages of lamination performed upon the sheet in FIGURE 3.

FIGURE 4 illustrates in section the layers of the sheet as they progress through the extrusion apparatus of FIGURE 3.

The innermost layer 15 (FIGURE 2) is a coating of polyethylene which gives better adhesion to the headpiece 4 than does ethylene-acrylic acid co-polymer. The innermost layer 15 may be added in a subsequent coating operation, as by extrusion.

While the present invention has been described in particular reference to a co-polymer of an olefin and an ethylenically unsaturated carboxylic acid, it is to be understood that any suitable plastic may be employed in carrying out the present invention.

It will be seen that applicants have provided a method for the continuous coating of a laminated sheet which gives collapsible tubes an extended shelf life without delamination of the individual layers of the tube wall. A collapsible plastic tube which does not delaminate has the feel of a single wall tube similar to that experienced with collapsible metal tubes.

Having thus described our invention, we claim:

1. A method of making a laminated web including a base layer the surface of which has been primed by heat treatment or by using polyethylene imine comprising the continuous steps of moving the primed base layer to a first coating station, coating the base layer with an intermediate layer of a copolymer of an ethylene and an ethylenically unsaturated carboxylic acid, coating the intermediate layer with a sheet of metal foil, moving the web to a priming station, priming the surface of the metal foil, moving the web to a second coating station, and coating the metal foil with a layer of a copolymer of an ethylene and an ethylenically unsaturated carboxylic acid.

2. The method of claim 1 wherein metal foil layer is aluminum.

References Cited

UNITED STATES PATENTS

| | | | |
|---|---|---|---|
| 3,033,707 | 5/1962 | Lacy et al. | 156—244 X |
| 3,260,410 | 7/1966 | Brandt et al. | 222—107 |
| 3,323,965 | 6/1967 | Hanle et al. | 156—244 |
| 3,343,663 | 9/1967 | Seidler | 161—216 X |
| 3,347,419 | 10/1967 | Brandt et al. | 222—107 |

JOHN T. GOOLKASIAN, Primary Examiner

J. D. SMITH, Assistant Examiner

U.S. Cl. X.R.

156—244; 161—216, 250; 222—107